United States Patent
De Jong et al.

(10) Patent No.: US 12,006,975 B2
(45) Date of Patent: Jun. 11, 2024

(54) DUPLEX HARDENED CAGE PILOT SURFACE FOR BEARING RING

(71) Applicant: Schaeffler Technologies AG & Co. KG, Herzogenaurach (DE)

(72) Inventors: Rick De Jong, Stratford (CA); Roland Plum, Stratford (CA); Ben Baer, Denfield (CA)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 466 days.

(21) Appl. No.: 16/810,340

(22) Filed: Mar. 5, 2020

(65) Prior Publication Data
US 2021/0277948 A1    Sep. 9, 2021

(51) Int. Cl.
    F16C 33/64    (2006.01)
(52) U.S. Cl.
    CPC .......... *F16C 33/64* (2013.01); *F16C 2220/00* (2013.01)
(58) Field of Classification Search
    CPC ... F16C 2223/10; F16C 2223/14; F16C 33/64
    See application file for complete search history.

(56) References Cited

U.S. PATENT DOCUMENTS

| | | | |
|---|---|---|---|
| 4,890,940 A | 1/1990 | Schmidt et al. | |
| 5,165,804 A | 11/1992 | Fisher et al. | |
| 5,531,836 A * | 7/1996 | Dezzani | C21D 9/40 148/233 |
| 5,855,531 A * | 1/1999 | Mitamura | C21D 9/40 476/46 |
| 6,966,954 B2 | 11/2005 | Rhoads et al. | |
| 2002/0069938 A1 | 6/2002 | Hanakawa et al. | |
| 2006/0193545 A1* | 8/2006 | Bridges | F16C 33/3843 384/470 |
| 2013/0306194 A1 | 11/2013 | Chin et al. | |
| 2014/0182747 A1* | 7/2014 | McCoy | C22C 38/30 148/230 |

FOREIGN PATENT DOCUMENTS

| | | | |
|---|---|---|---|
| EP | 1450058 A2 | 8/2004 | |
| JP | 2018-115747 A | 7/2018 | |
| WO | WO-2019160836 A1 * | 8/2019 | F16C 33/34 |

OTHER PUBLICATIONS

Jonsson, U.; "Tribology Challenges in the Areospace Industry" United Technologies Research Center; (PDF) (Sep. 26, 2013).

* cited by examiner

*Primary Examiner* — Kyle A Cook
(74) *Attorney, Agent, or Firm* — Volpe Koenig

(57) ABSTRACT

A method of forming a bearing ring having improved hardness is disclosed herein. The method generally includes a duplex hardening process in which the bearing ring is first subjected to a heat treatment. After the heat treatment process, the bearing ring undergoes a nitriding treatment in predetermined portions, including at least a raceway and a cage pilot surface.

11 Claims, 4 Drawing Sheets

DUPLEX HARDENED CAGE PILOT SURFACE FOR BEARING RING

FIELD OF INVENTION

The present disclosure relates to a specially formed bearing ring having increased hardness in specific areas.

BACKGROUND

Bearing assemblies generally include an inner bearing ring, outer bearing ring, and rolling elements arranged therebetween. In certain arrangements, bearing cages are used to support, position, and space the rolling elements. The bearing rings can be modified in these situations where bearing cages are employed such that the bearing rings include pilot surfaces for guiding the bearing cages.

These cage pilot surfaces on the bearing ring experience high wear due to friction with the bearing cage. A small gap is typically defined between interfacing surfaces defined on the bearing ring and the bearing cage. This gap is required to ensure that the cage is maintained in a concentric position relative to the axis of rotation of the rolling elements and the bearing rings, such that the bearing cage performs its main function of spacing and positioning the rolling elements from each other. However, this gap also traps wear particulate and debris during operation, which ultimately may cut grooves into or otherwise divot or mar the interfacing surfaces on the cage pilot surface of the bearing ring or the cage itself. If debris is generated due to this wear, the debris causes performance degradation and will eventually cause the bearing to malfunction and fail.

One known solution for these issues is to provide a titanium nitride (TiN) coating. However, these coatings are expensive, thus making them cost-prohibitive for many situations, applications, and users. Further, although TiN coatings provide a higher degree of durability, these coatings are also subject to flaking, which can also lead to performance degradation.

It would be desirable to provide an improved bearing ring that has specifically designed cage pilot surfaces sufficient to withstand high wear conditions, that is cheaper than TiN coatings and also does not experience flaking.

SUMMARY

A method of forming a bearing ring having improved hardness is generally disclosed herein. The method generally includes a duplex hardening process in which the bearing ring is first subjected to a heat treatment. After the heat treatment process, the bearing ring is nitrided in predetermined regions, including a raceway, a rolling element guide surface, and a cage pilot surface. The bearing ring does not include a TiN coating.

In one embodiment, the method of treating the bearing ring includes: (i) applying a heat treatment to the bearing ring; and (ii) applying a nitriding treatment only to the raceway, as well as cage pilot surfaces and rolling element guide surfaces located adjacent to the raceway.

In one embodiment, the bearing ring is formed from M50NIL steel. Other forms of bearing grade steel can be used.

A masking treatment can be applied between steps (i) and (ii). In one embodiment, the masking treatment is applied only to areas of the bearing ring located away from the raceway, the cage pilot surfaces, and the rolling element guide surfaces, such that these surfaces are exposed for step (ii).

In one embodiment, the method includes applying a finishing treatment to the bearing ring after step (ii).

In one embodiment, a base material hardness within 0.6 mm of the bearing ring has a Vickers hardness of 670 after step (i), and the raceway, the rolling element guide surfaces, and the cage pilot surfaces have a Vickers hardness greater than 800 HV0.3 at a depth of less than 0.3 mm from an outer surface of the raceway, the rolling element guide surfaces, and the cage pilot surfaces.

The method for treating a bearing ring can be adopted for any type of bearing ring and any type of bearing assembly.

In another embodiment, the method the following steps:

Applying a heat treatment to the bearing ring formed from M50NIL steel, such that a base material hardness within 0.6 mm of an outer surface of the bearing ring has a Vickers hardness of 670.

Pre-grinding the entire bearing ring.

Masking portions of the bearing ring except for a raceway and a predetermined area directly adjacent to the raceway, wherein the predetermined area includes radially extending shoulders forming cage pilot surfaces and rolling element guide surfaces.

Applying a nitriding treatment to the bearing ring to form a case-hardened outer layer surface on the raceway and the predetermined area, such that the raceway and the predetermined area have a Vickers hardness greater than 800 HV0.3 at a depth of less than 0.3 mm from an outer surface of the raceway and the predetermined area.

Finally, the method includes applying a finishing treatment to the bearing ring, such that a thickness of the case-hardened outer layer surface is reduced by 20%-40%.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
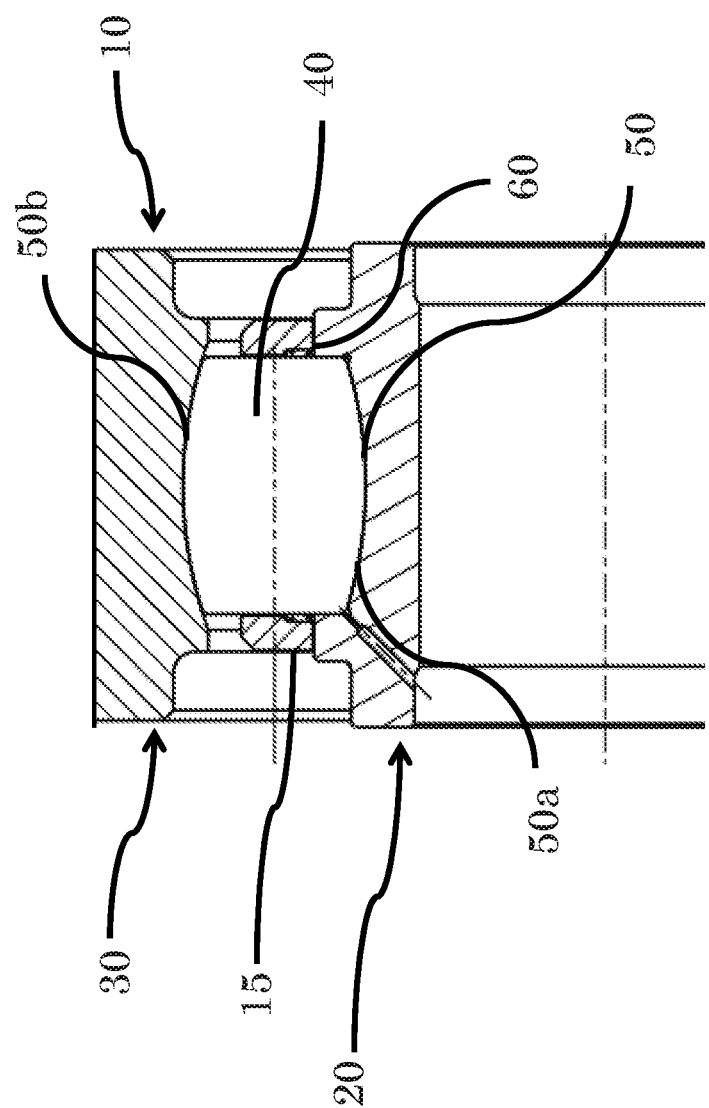
FIG. 1 is a cross-sectional view of a bearing assembly according to one embodiment.

FIG. 1 illustrates a bearing assembly 10 including an inner bearing ring 20, an outer bearing ring 30, and a plurality of rolling elements 40 supported therebetween. A cage 15 is provided for supporting and spacing the rolling elements 40 from each other. In one embodiment, the cage 15 is silver-plated. Other varieties of cages 15 can be used, with differing shapes and formed from different materials. The rolling elements 40 are supported on raceways 50a, 50b (generically indicated with reference numeral 50) of the bearing rings 20, 30.

Figure 2A:
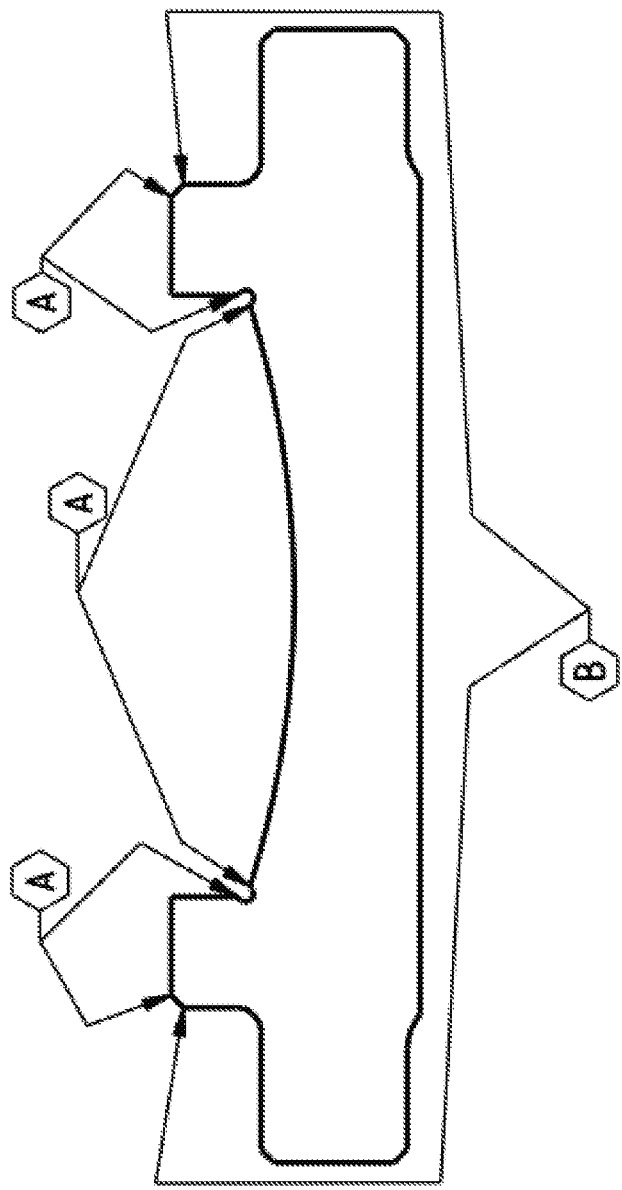
FIG. 2A is cross-sectional view of a bearing ring of the bearing assembly of FIG. 1 illustrating specific regions of treatment of the bearing ring.
Figure 2B:
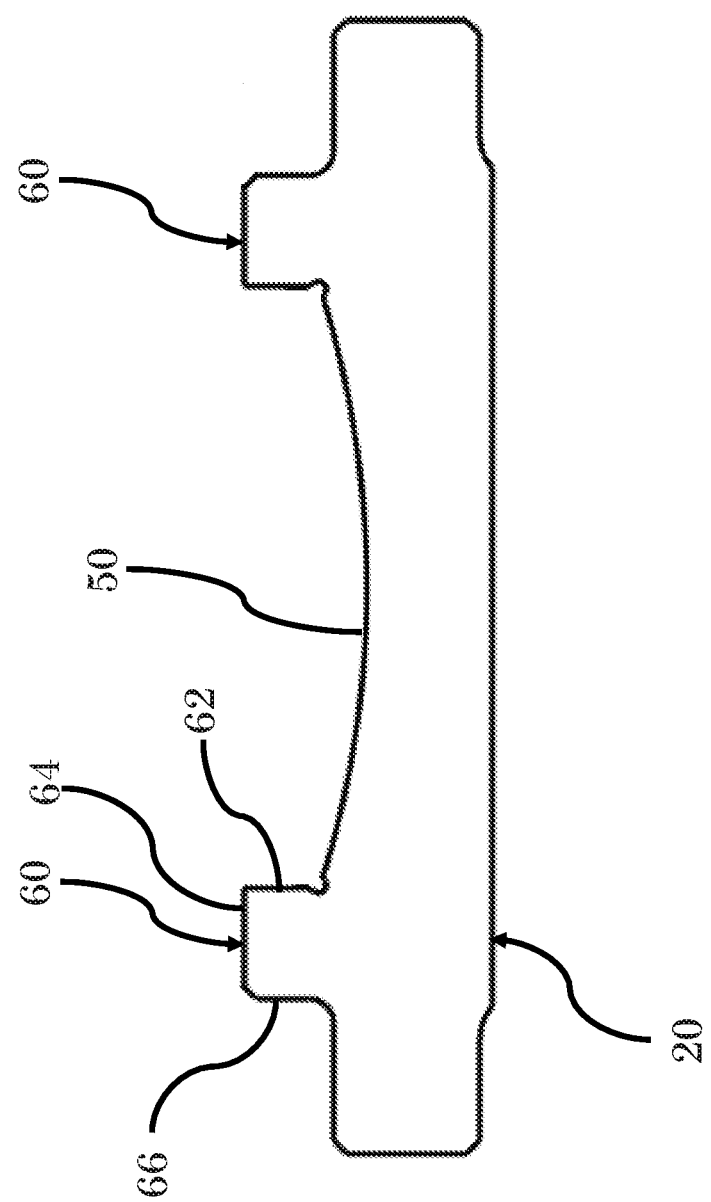
FIG. 2B is another cross-sectional view of the bearing ring of FIGS. 1 and 2, illustrating specific regions of the bearing ring.

FIG. 2B provides further definition regarding the specific portions of the inner bearing ring 20. As shown in FIG. 2B, the inner bearing ring includes radially outwardly extending shoulders 60 on either axial end of the raceway 50. The radially outwardly extending shoulders 60 partially define cage pilot surfaces (shown by radially outermost surface 64 of the radially outwardly extending shoulders 60) and rolling element guide surfaces (shown by axially inner portions 62 of the radially outwardly extending shoulders 60). The rolling element guide surfaces are indicated by reference numeral 62 herein, and the cage pilot surfaces are indicated by reference numeral 64 herein.

The rolling element guide surfaces 62 extend radially outward, while the cage pilot surfaces 64 extend in an axial direction. The rolling element guide surfaces 62 intersect with the cage pilot surfaces 64. Portions 62 and 64 of the radially outwardly extending shoulders 60 are the specific areas of interest with respect to the further hardening steps disclosed herein. The axially outward facing surfaces 66 of the radially outwardly extending shoulders 60 are not specially treated or hardened.

Processing or treatment steps are described in more detail herein for the bearing rings 20, 30. While the treatment steps described herein are generally described with respect to the inner bearing ring 20, one of ordinary skill in the art would understand that the present disclosure is not limited to the inner bearing ring 20 and the treatment can be applied to the outer bearing ring 30.

In one embodiment, the bearing rings 20, 30 disclosed herein are formed from M50NIL steel. One of ordinary skill in the art would understand based on the present disclosure that alternative varieties of low-carbon, carburizing bearing steel can be used to form the bearing rings. In one embodiment, ordinary M50 steel may be used. Further, one of ordinary skill in the art would understand based on the present disclosure that the treatment steps disclosed herein can be adopted for a variety of bearing rings formed from other materials.

A method of treating the bearing rings generally includes two primary hardening steps. In other words, a duplex hardening process is disclosed herein. The method generally includes (i) applying a heat treatment to the bearing ring 20, and (ii) applying a nitriding treatment only to the raceway 50, the rolling element guide surfaces 62, and the cage pilot surfaces 64 located adjacent to the raceway 50 of the inner bearing ring 20.

In one embodiment, step (i) includes heating the bearing ring 20 to at least 1000° C. for at least 25 hours. In one embodiment, the duration of heating during step (i) can vary between 12 hours to 60 hours. More specifically, in one embodiment step (i) can include heating the bearing ring 20 to at least 1070° C. for 30 hours. In one embodiment, after step (i), a hardened layer is defined on an outer surface of the bearing ring 20, having a depth of at least 0.80 mm. The duration and temperature for step (i) can vary depending on the specific requirements for the bearing application. For bearing assemblies including relatively larger rolling elements, the case depth provided by step (i) generally is increased.

In one embodiment, step (ii) includes heating the bearing ring 20 to at least 490° C. for at least 80 hours. More specifically, in one embodiment step (ii) can include heating the bearing ring 20 to at least 495° C. for 90 hours.

One of ordinary skill in the art would understand based on the present disclosure that step (ii) can include a variety of types of nitriding, such as ion nitriding, plasma nitriding, gas nitriding, or any other form of nitriding.

In one embodiment, the bearing ring 20 is masked between steps (i) and (ii). The masking treatment is applied only to areas of the bearing ring 20 away from the raceway 50, the rolling element guide surfaces 62, and the cage pilot surfaces 64, such that the raceway 50, the rolling element guide surfaces 62, and the cage pilot surfaces 64 are exposed for step (ii). This is best illustrated in FIG. 2A, which shows areas "A" corresponding to the raceway 50, the rolling element guide surfaces 62, and the cage pilot surfaces 64, and area "B" corresponding to areas that are masked and do not receive the nitriding treatment. The regions between the arrowheads for lead lines for area "B" are masked and do not receive the nitriding treatment. All of the regions marked by lead lines and between arrowheads for area "A" are not masked, and therefore undergo the nitriding treatment.

In one embodiment, step (ii) produces a case-hardened outer surface layer having a thickness of at least 0.10 mm-0.20 mm. In one embodiment, the method further includes applying a finishing treatment to the bearing ring 20 after step (ii). This finishing treatment can remove at least 0.025 mm-0.075 of the case-hardened outer surface layer. In one embodiment, the finishing treatment can remove approximately ⅓ of the case-hardened outer surface layer. One of ordinary skill in the art understands these values will vary greatly depending on the particular performance requirements of a specific bearing assembly.

In one embodiment, a base material hardness within 0.6 mm of an outer surface of the bearing ring 20 has a Vickers hardness of 670 after step (i), and the raceway 50, the rolling element guide surfaces 62, and the cage pilot surfaces 64 have a Vickers hardness greater than 800 HV0.3 at a depth of less than 0.3 mm from the outer surface of bearing ring 20.

The method steps disclosed herein can be used for any type of bearing, including a bearing assembly 10 having spherical bearing rolling elements, barrel-shaped rolling elements, tapered rolling elements, or any other type of rolling element. One of ordinary skill in the art would understand that this process of treating bearing rings can be adopted for bearing assemblies including bearing rings having any size, shape, or geometry, including bearing rings that lack roller guide flanges/pilot surfaces.

In one embodiment, a clearance defined between the bearing cage 15 and the cage pilot surfaces 64 is less than 1.0 mm-2.0 mm. This clearance can vary depending on the specific requirements of a particular bearing configuration.

Figure 3:
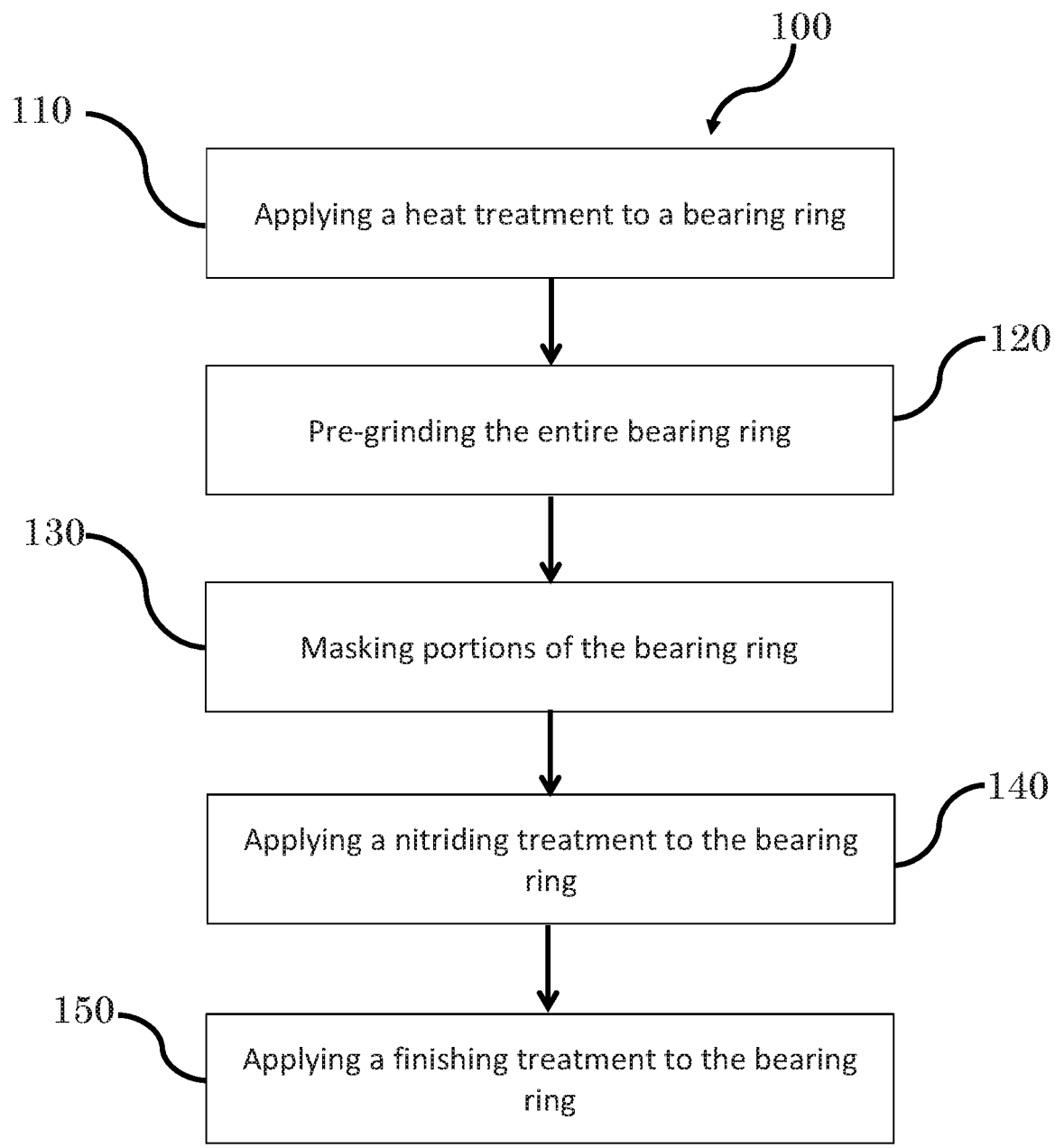
FIG. 3 is a flow chart illustrating method steps of treating a bearing ring according to one embodiment.

As shown in FIG. 3, one embodiment of treating a bearing ring 100 includes the following steps. First, step 110 includes applying a heat treatment to the bearing ring 20 formed from M50NIL steel, such that a base material hardness within 0.6 mm of an outer surface of the bearing ring 20 has a Vickers hardness of 670. Next, step 120 includes pre-grinding the entire bearing ring 20. After step 120, the method includes step 130, which requires masking portions of the bearing ring 20 except for a raceway 50 and a predetermined area directly adjacent to the raceway 50. Step 140 then includes applying a nitriding treatment to the bearing ring 20 to form a case-hardened outer layer surface on the raceway 50 and the predetermined area, such that the raceway 50 and the predetermined area have a Vickers hardness greater than 800 HV0.3 at a depth of less than 0.3 mm from an outer surface of the raceway 50 and the predetermined area. Finally, step 150 includes applying a finishing treatment to the bearing ring 20, such that a thickness of the case-hardened outer layer surface is reduced by 20%-40%.

One of ordinary skill in the art would understand that any one or more of the steps of FIG. 3 can be included or excluded. Further, additional steps not specifically illustrated in FIG. 3 can be used.

Specific values and materials of the treatment process 100 can be varied depending on the specific requirements for a particular bearing application.

The present disclosure is not just limited to methods or processes, and also includes the bearing ring 20 itself. The bearing ring 20 includes a hardened raceway 50 and hardened cage pilot surfaces 60. The bearing ring 20 is formed by the method steps disclosed herein, such that both the raceway 50 and a predetermined area (defined generally as the rolling element guide surfaces 62 and the cage pilot surfaces 64) have a Vickers hardness greater than 800 HV0.3 at a depth of less than 0.3 mm from an outer surface of the raceway 50 and the predetermined area.

The embodiments disclosed herein provide a higher degree of durability than bearing rings having TiN coatings. The methods of treating bearing rings and the bearing rings themselves disclosed herein do not require titanium, either as a core component to form the bearing rings themselves or as a coating to the bearing rings (i.e. TiN coating). This results in a more cost-effective solution for providing sufficiently hardened bearing rings for high wear situations, and also avoids flaking caused by titanium-based coatings.

One of ordinary skill in the art would also understand that the duplex hardening steps disclosed herein can generally be applied to rolling elements themselves to improve durability.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS

Bearing Assembly 10
Cage 15
Inner ring 20
Outer ring 30
Rolling elements 40
Raceways 50, 50a, 50b
Radially outwardly extending shoulders 60
Axially inner portions of the shoulders/rolling element guide surfaces 62
Radially outermost surface of the shoulders/cage pilot surfaces 64
Axially outward facing surfaces 66 of the shoulders

What is claimed is:

1. A method of treating a bearing ring, the method comprising:
   (i) applying a heat treatment to the bearing ring,
   (ii) applying a masking treatment to the bearing ring;
   (iii) applying a nitriding treatment to a raceway, rolling element guide surfaces located adjacent to the raceway, and cage pilot surfaces,
   wherein the masking treatment is applied only to areas of the bearing ring away from: the raceway, the rolling element guide surfaces, and the cage pilot surfaces such that the raceway, the rolling element guide surfaces, and the cage pilot surfaces are exposed for step (iii), and
   the cage pilot surfaces and the rolling element guide surfaces are each defined on radially outwardly extending shoulders of the bearing ring, and the cage pilot surfaces excludes axially outward facing surfaces of the radially outwardly extending shoulders.

2. The method of claim 1, wherein the bearing ring is formed from M50NIL steel.

3. The method of claim 1, wherein step (i) includes heating the bearing ring to at least 1000° C. for at least 25 hours.

4. The method of claim 1, wherein step (iii) includes heating the bearing ring to at least 490° C. for at least 80 hours.

5. The method of claim 1, wherein step (iii) produces a case-hardened outer surface layer having a thickness of at least 0.15 mm.

6. The method of claim 1, wherein a base material hardness within 0.6 mm of an outer surface of the bearing ring has a Vickers hardness of 670 after step (i), and the raceway, the rolling element guide surfaces, and the cage pilot surfaces have a Vickers hardness greater than 800 HV0.3 at a depth of less than 0.3 mm from an outer surface of the raceway, the rolling element guide surfaces, and the cage pilot surfaces.

7. The method of claim 1, wherein the bearing ring is installed in a bearing assembly including barrel-shaped rolling elements and a bearing cage that supports the barrel-shaped rolling elements, and a clearance defined between the bearing cage and the cage pilot surfaces is less than 1.0 mm-2.0 mm.

8. The method of claim 1, wherein the bearing ring excludes titanium.

9. The method of claim 1, further comprising applying a finishing treatment to the bearing ring after step (iii).

10. The method of claim 9, wherein the finishing treatment removes at least 0.05 mm of the case-hardened outer surface layer.

11. A method of forming a bearing ring, the method comprising:
    (i) applying a heat treatment to the bearing ring formed from M50NIL steel, such that a base material hardness within 0.6 mm of an outer surface of the bearing ring has a Vickers hardness of 670;
    (ii) pre-grinding the entire bearing ring;
    (iii) masking portions of the bearing ring except for a raceway and a predetermined area directly adjacent to the raceway, wherein the predetermined area includes radially extending shoulders forming cage pilot surfaces and rolling element guide surfaces, and the cage pilot surfaces excludes axially outward facing surfaces of the radially extending shoulders;

(iv) applying a nitriding treatment to the bearing ring to form a case-hardened outer layer surface on the raceway and the predetermined area, such that the raceway and the predetermined area have a Vickers hardness greater than 800 HV0.3 at a depth of less than 0.3 mm from an outer surface of the raceway and the predetermined area; and (v) applying a finishing treatment to the bearing ring, such that a thickness of the case-hardened outer layer surface is reduced by 20%-40%.

\* \* \* \* \*